US010362186B2

(12) United States Patent
Motoyama

(10) Patent No.: US 10,362,186 B2
(45) Date of Patent: Jul. 23, 2019

(54) IMAGE SCANNING APPARATUS WITH TIMING CONTROL FOR DOCUMENT FEEDER, AND METHOD AND COMPUTER-READABLE MEDIUM THEREFOR

(71) Applicant: BROTHER KOGYO KABUSHIKI KAISHA, Nagoya, Aichi (JP)

(72) Inventor: Toshiki Motoyama, Konan (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/872,231

(22) Filed: Jan. 16, 2018

(65) Prior Publication Data

US 2018/0227450 A1 Aug. 9, 2018

(30) Foreign Application Priority Data

Feb. 8, 2017 (JP) .................................. 2017-021015

(51) Int. Cl.
*H04N 1/04* (2006.01)
*H04N 1/00* (2006.01)

(52) U.S. Cl.
CPC ..... *H04N 1/00708* (2013.01); *H04N 1/00588* (2013.01); *H04N 1/00694* (2013.01); *H04N 1/00718* (2013.01); *H04N 2201/0081* (2013.01)

(58) Field of Classification Search
CPC combination set(s) only.
See application file for complete search history.

(56) References Cited

U.S. PATENT DOCUMENTS

| 5,760,412 | A | * | 6/1998 | Yang | H04N 1/00681 250/234 |
| 7,194,217 | B2 | * | 3/2007 | Hosoi | G03G 15/607 399/371 |
| 9,635,203 | B2 | * | 4/2017 | Kadobayashi | H04N 1/00782 |
| 2002/0089706 | A1 | * | 7/2002 | Wong | H04N 1/00795 358/505 |
| 2006/0177252 | A1 | * | 8/2006 | Kawaji | G03G 15/607 399/371 |
| 2010/0092189 | A1 | * | 4/2010 | Shimizu | G03G 15/5029 399/43 |
| 2015/0085330 | A1 | * | 3/2015 | Suese | H04N 1/00782 358/488 |

FOREIGN PATENT DOCUMENTS

| JP | S61-111260 | A | | 5/1986 |
| JP | H05-107842 | A | | 4/1993 |
| JP | 2002-265094 | A | | 9/2002 |
| JP | 2006-041809 | A | | 2/2006 |
| JP | 2006041809 | A | * | 2/2006 |

* cited by examiner

Primary Examiner — Dung D Tran
(74) Attorney, Agent, or Firm — Scully, Scott, Murphy & Presser, PC

(57) ABSTRACT

An image scanning apparatus includes a controller configured to perform a setting process to set a specific waiting time for a timer, based on a detected position of a document guide. The setting process includes, when the detected position of the document guide is a particular guide position for a first-size document sheet, setting a first waiting time as the specific waiting time for the timer, and when the detected position of the document guide is not the particular guide position, setting a second waiting time as the specific waiting time for the timer, the second waiting time being longer than the first waiting time.

8 Claims, 7 Drawing Sheets

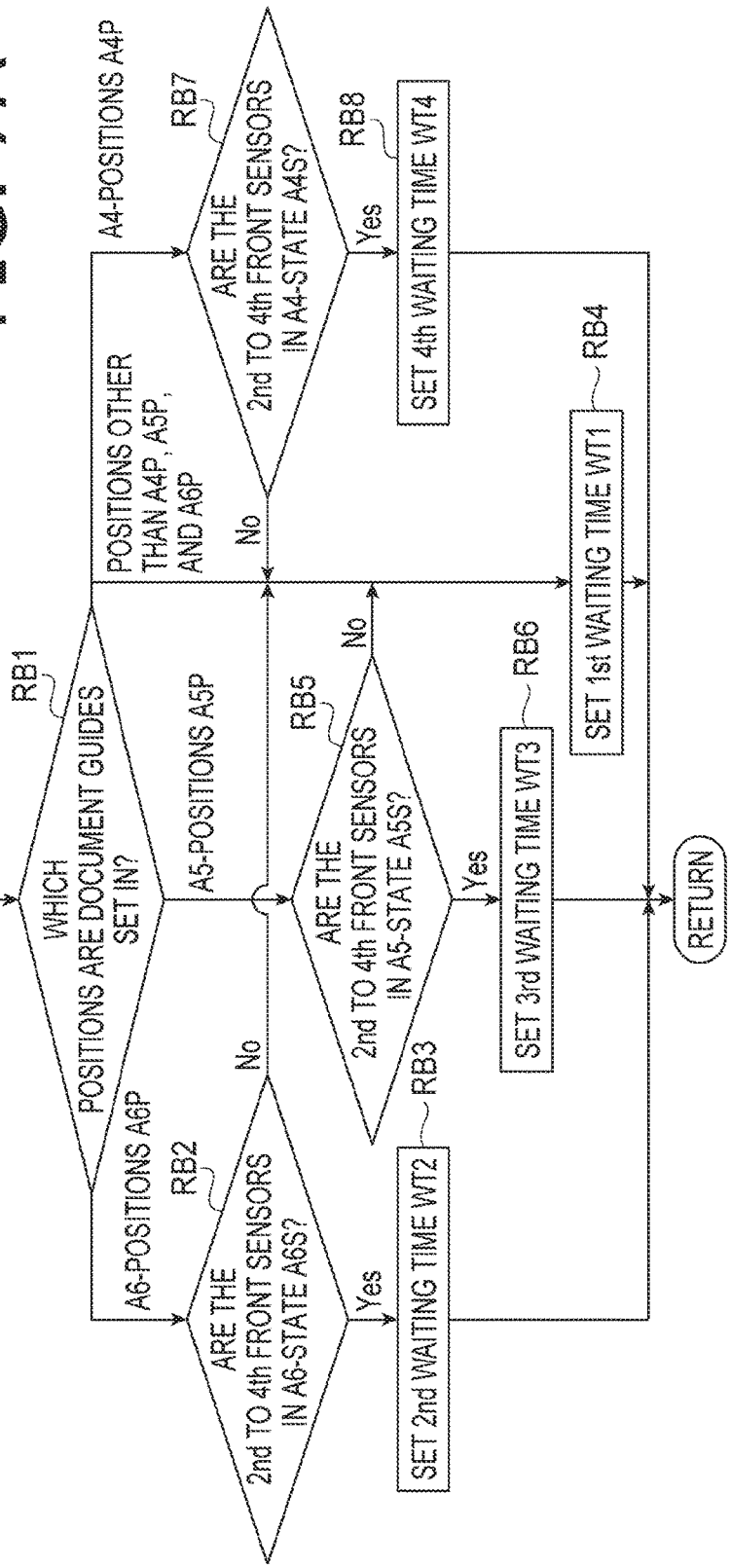

IMAGE SCANNING APPARATUS WITH TIMING CONTROL FOR DOCUMENT FEEDER, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2017-021015 filed on Feb. 8, 2017. The entire subject matter of the application is incorporated herein by reference.

BACKGROUND

Technical Field

Aspects of the present disclosure are related to an image scanning apparatus, and a method and a computer-readable medium therefor.

Related Art

An image scanning apparatus has been known that is configured to detect a document sheet placed on a feed tray and start document scanning even without a scanning start button being pressed.

In the known apparatus, after a user sets a timer value for a timer in a timer setting mode of the apparatus and places document sheets on the feed tray, document feeding is started in response to the timer counting to the set timer value.

SUMMARY

When document guides for guiding side ends of each of document sheets placed on the feed tray are set in positions appropriate for the width of the document sheets, the side ends of each document sheet are guided along the document guides. Hence, the user only has to place the document sheets between the document guides. Meanwhile, when the document guides are not set in the appropriate positions for the width of the document sheets, the side ends of each document sheet are not guided along the document guides. Therefore, the user needs to set the document sheets in a properly aligned manner.

In the known apparatus, when the document guides are set in the appropriate positions for the width of the document sheets placed on the feed tray, the user may shorten the timer value to such an extent that the user can place the document sheet between the document guides. When the document guides are not set in the appropriate positions for the width of the document sheets, the user needs to set the timer value to be so long that the user can place the document sheets in a properly aligned manner. Thus, the known apparatus may start document feeding without keeping the user waiting uselessly. Nonetheless, the user is required to perform a troublesome operation of manually resetting the timer value.

Aspects of the present disclosure are advantageous to provide one or more techniques, for an image scanning apparatus, which make it possible to start document feeding after an adequate waiting time has elapsed since document sheets were placed on a feed tray, without a user having to manually reset a timer value, regardless of whether document guides are set in appropriate positions for a width of the document sheets.

According to aspects of the present disclosure, an image scanning apparatus is provided, which includes a document tray configured to support one or more document sheets placed thereon, a conveyor configured to convey the one or more document sheets placed on the document tray, in a conveyance direction in a manner separated on a sheet-by-sheet basis, a document guide movable along a main scanning direction perpendicular to the conveyance direction, the document guide being configured to guide side ends of each of the one or more document sheets placed on the document tray, a position detector configured to detect a position of the document guide, a first document detector configured to detect whether there is a document sheet placed on the document tray, a timer configured to count to a waiting time set for the timer, an image scanner configured to perform image scanning of the one or more document sheets being conveyed by the conveyor, and a controller. The controller is configured to, in response to the first document detector detecting a document sheet placed on the document tray, determine whether the detected position of the document guide is a first guide position for guiding a first-size document sheet of a first particular size, and perform a setting process to set a specific waiting time for the timer, based on the detected position of the document guide. The setting process includes, when determining that the detected position of the document guide is the first guide position, setting a first waiting time as the specific waiting time for the timer, and when determining that the detected position of the document guide is not the first guide position, setting a second waiting time as the specific waiting time for the timer, the second waiting time being longer than the first waiting time. The controller is further configured to, in response to the timer counting to the specific waiting time since the detection, by the first document detector, of the document sheet placed on the document tray, perform a scanning process to control the conveyor to convey the document sheet and control the image scanner to perform image scanning of the document sheet, thereby acquiring a scanned image of the document sheet.

According to aspects of the present disclosure, further provided is a method implementable on a processor coupled with an image scanning apparatus having a tray. The method includes detecting a sheet placed on the tray, detecting a position of a document guide, the document guide being provided on the tray, determining whether the detected position of the document guide is a first guide position, setting one of a first waiting time and a second waiting time, the first waiting time being set when it is determined that the detected position of the document guide is the first guide position, the second waiting time being set when it is determined that the detected position of the document guide is not the first guide position, the second waiting time being greater than the first waiting time, determining whether the timer completes counting the one of the first waiting time and the second waiting time since detecting the sheet on the tray, and in response to determining that the timer completes counting the one of the first waiting time and the second waiting time, starting conveying the sheet on the tray.

According to aspects of the present disclosure, further provided is a non-transitory computer-readable medium storing computer-readable instructions that are executable by a processor coupled with an image scanning apparatus. The image scanning apparatus includes a document tray configured to support one or more document sheets placed thereon, a conveyor configured to convey the one or more document sheets placed on the document tray, in a conveyance direction in a manner separated on a sheet-by-sheet basis, a document guide movable along a main scanning direction perpendicular to the conveyance direction, the document guide being configured to guide side ends of each of the one or more document sheets placed on the document tray, a position detector configured to detect a position of the document guide, a first document detector configured to detect whether there is a document sheet placed on the document tray, a timer configured to count to a waiting time set for the timer, and an image scanner configured to perform image scanning of the one or more document sheets being conveyed by the conveyor. The instructions are configured to, when executed by the processor, cause the processor to, in response to the first document detector detecting a document sheet placed on the document tray, determine whether the detected position of the document guide is a first guide position for guiding a first-size document sheet of a first particular size, and perform a setting process to set a specific waiting time for the timer, based on the detected position of the document guide. The setting process includes, when determining that the detected position of the document guide is the first guide position, setting a first waiting time as the specific waiting time for the timer, and when determining that the detected position of the document guide is not the first guide position, setting a second waiting time as the specific waiting time for the timer, the second waiting time being longer than the first waiting time. The instructions are further configured to, when executed by the processor, cause the processor to, in response to the timer counting to the specific waiting time since the detection, by the first document detector, of the document sheet placed on the document tray, perform a scanning process to control the conveyor to convey the document sheet and control the image scanner to perform image scanning of the document sheet, thereby acquiring a scanned image of the document sheet.

BRIEF DESCRIPTION OF THE ACCOMPANYING DRAWINGS

FIG. 7A is a flowchart showing a procedure of a guide-position-based waiting time setting process in the illustrative embodiment according to one or more aspects of the present disclosure.

FIG. 7B is a table showing an ON/OFF state of each of the second to fourth front sensors in each of an A4-state, an A5-state, and an A6-state, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

<Configuration of Image Scanning Apparatus>

Figure 1:
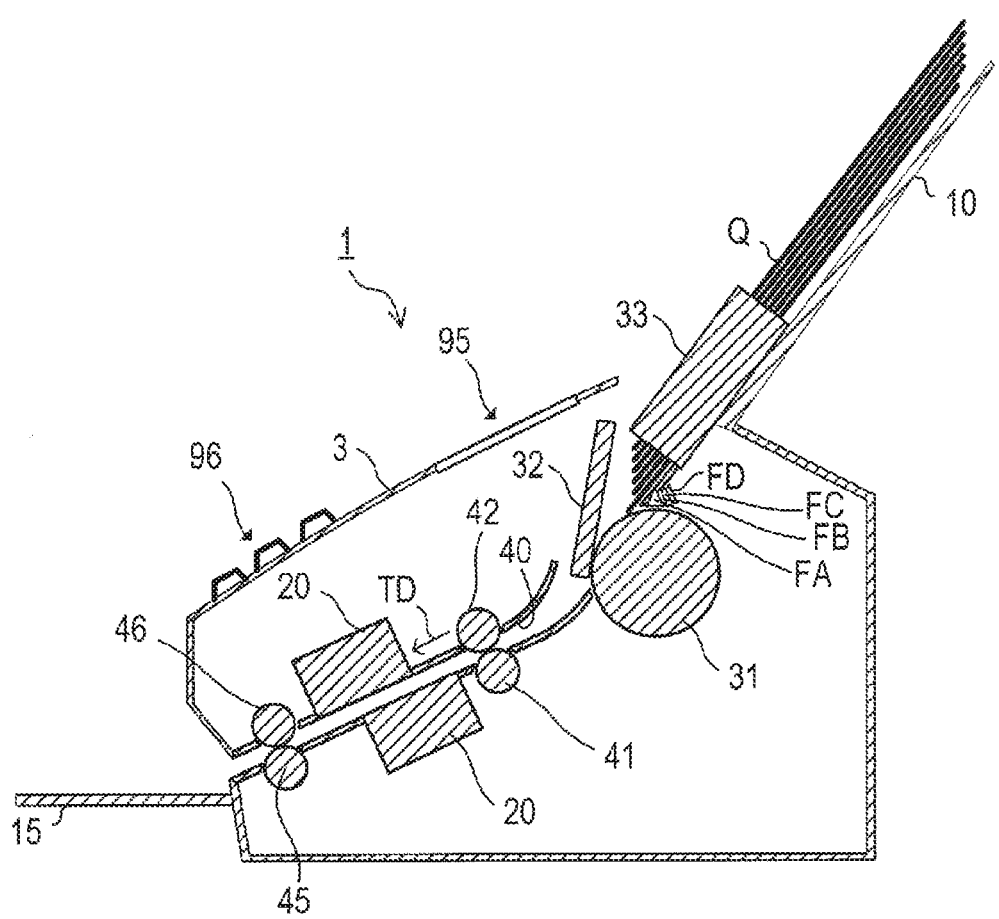
FIG. 1 is a cross-sectional side view showing an internal configuration of an image scanning apparatus in an illustrative embodiment according to one or more aspects of the present disclosure.

FIG. 1 is a cross-sectional side view showing an internal configuration of an image scanning apparatus 1 in an illustrative embodiment according to aspects of the present disclosure. The image scanning apparatus 1 is configured as an ADF-type scanner ("ADF" is an abbreviated form of "Automatic Document Feeder"). The image scanning apparatus 1 includes a document tray 10, a main body 3, and a discharge tray 15. The image scanning apparatus 1 further includes an operation interface (hereinafter referred to as an "operation I/F") 96 and a display 95. The operation I/F 96 and the display 95 are disposed on an upper surface of the main body 3. The operation I/F 96 includes a plurality of operable members such as a power supply switch and various setting buttons. The operation I/F 96 is configured to accept various instructions from a user. For instance, the operation I/F 96 includes setting buttons for designating settings for an image scanning operation. The display 95 includes an LCD configured to display a status of the image scanning apparatus 1.

A conveyance path 40 is formed inside the main body 3. Document sheets Q placed on the document tray 10 are conveyed in a conveyance direction TD along the conveyance path 40 and discharged onto the discharge tray 15. A pickup roller 31, a separation pad 32, two upstream conveyance rollers 41 and 42, two line sensors 20, and two downstream conveyance rollers 45 and 46 are disposed along the conveyance path 40.

The pickup roller 31 is configured to feed the document sheets Q placed on the document tray 10, on a sheet-by-sheet basis in cooperation with the separation pad 32. The upstream conveyance roller 41, the downstream conveyance roller 45, and the pickup roller 31 are driven by a conveyance motor 51 (see FIG. 4) through a transmission mechanism 52 (see FIG. 4). The conveyance rollers 41, 42, 45, and 46 are configured to convey the document sheets Q fed by the pickup roller 31, in such a manner that the document sheets Q pass between the two line sensors 20.

The two line sensors 20 are disposed to face each other across the conveyance path 40, and are positioned between the upstream conveyance rollers 41 and 42 and the downstream conveyance rollers 45 and 46 in the conveyance direction TD. Thereby, in the illustrative embodiment, the image scanning apparatus 1 may scan both sides of each document sheet Q. Each line sensor 20 may include contact image sensors.

Figure 2:
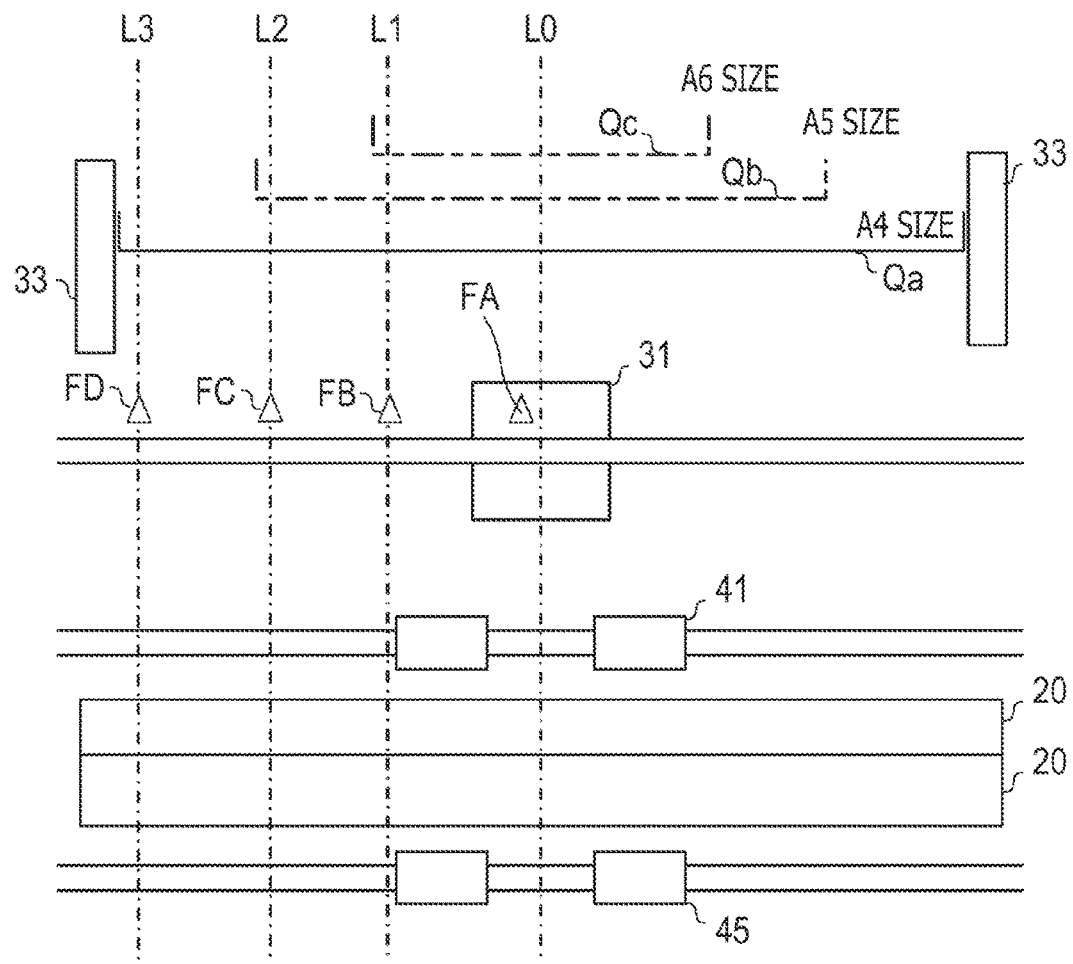
FIG. 2 is a plane view schematically showing a layout of two line sensors and first to fourth front sensors relative to a conveyance path, in the illustrative embodiment according to one or more aspects of the present disclosure.

As shown in FIG. 2, the image scanning apparatus 1 further includes a plurality of front sensors FA, FB, FC, and FD provided at the document tray 10. Each of the front sensors FA, FB, FC, and FD is configured to detect the document sheets Q. Specifically, each of the front sensors FA, FB, FC, and FD is disposed in a position where a document sheet Q to be scanned is separated from the document tray 10 by rotation of the pickup roller 31, in the conveyance direction TD. Hereinafter, the front sensor FA (see FIG. 2) disposed closer to a center line L0 than any other front sensors may be referred to as a first front sensor FA. It is noted that the center line L0 is substantially positioned at a center of the document tray 10 and the conveyance path 40 in a main scanning direction MD. The main scanning direction MD is perpendicular to the conveyance direction TD (see FIG. 2). Further, the front sensor FB disposed on an auxiliary line L1 may be referred to as a second front sensor FB. The auxiliary line L1 is spaced apart from the center line L0 in an upstream direction along the main scanning direction MD. Further, the front sensor FC disposed on an auxiliary line L2 may be referred to as a third front sensor FC. The auxiliary line L2 is farther away from the center line L0 than the auxiliary line L1 in the upstream direction along the main scanning direction MD. Further, the front sensor FD disposed on an auxiliary line L3 may be referred to as a fourth front sensor FD. The auxiliary line L3 is farther away from the center line L0 than the auxiliary lines L1 and L2 in the upstream direction along the main scanning direction MD.

Figure 3A:
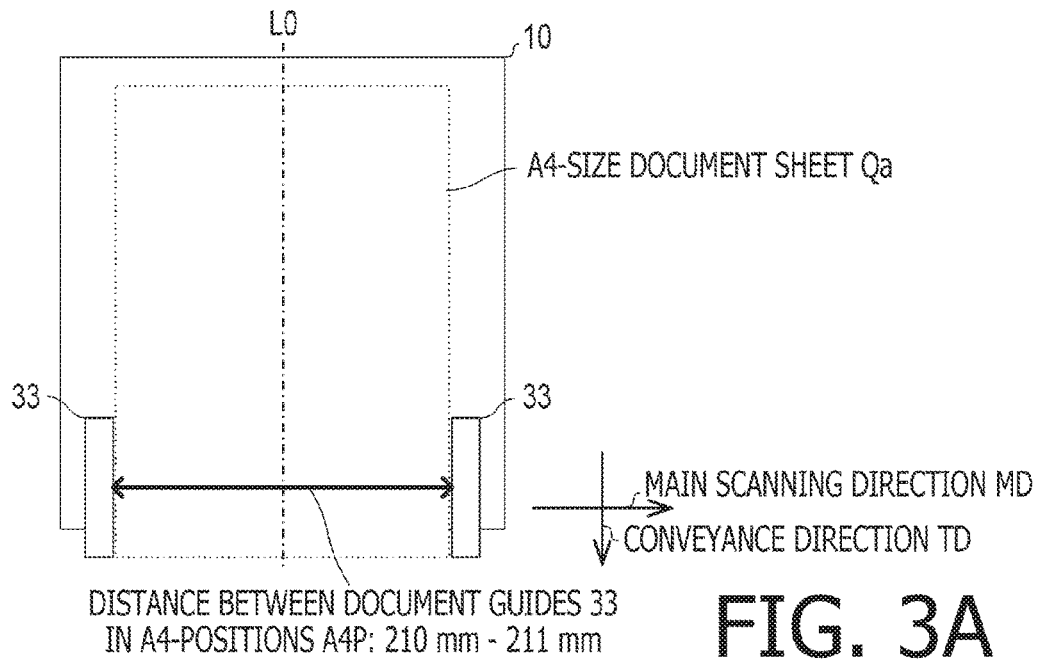
FIG. 3A shows a distance between document guides in a state where an A4-size document sheet is placed on a document tray, in the illustrative embodiment according to one or more aspects of the present disclosure.
Figure 3B:
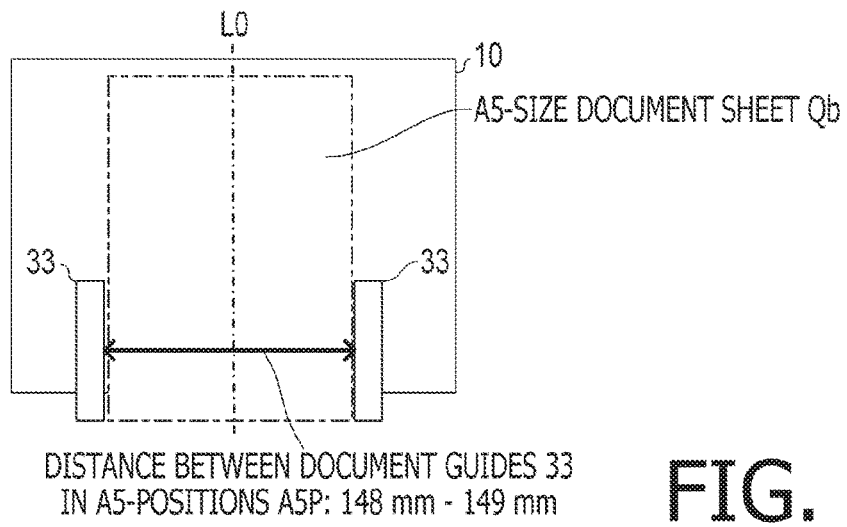
FIG. 3B shows a distance between the document guides in a state where an A5-size document sheet is placed on the document tray, in the illustrative embodiment according to one or more aspects of the present disclosure.
Figure 3C:
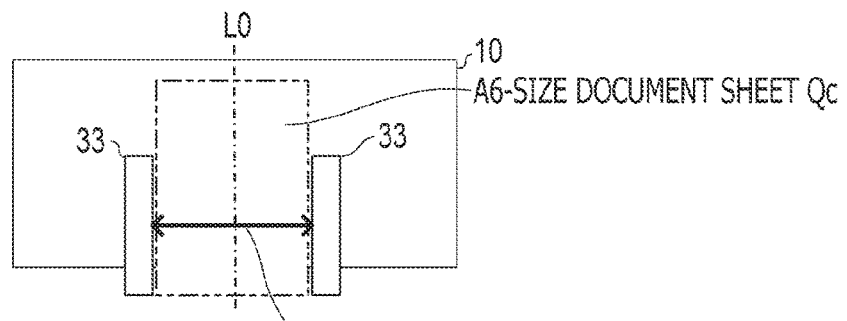
FIG. 3C shows a distance between the document guides in a state where an A6-size document sheet is placed on the document tray, in the illustrative embodiment according to one or more aspects of the present disclosure.

Correspondence relations between features about how the document sheets Q are placed on the document tray 10 and positions of the front sensors FA, FB, FC, and FD will be described with reference to FIGS. 2 and 3. The document tray 10 is configured as a center register type document tray. Namely, as shown in FIGS. 3A, 3B, and 3C, the document tray 10 is configured to allow the user to place the document sheets Q of a same size on the document tray 10 in such a manner that a center of the document sheets Q in the main scanning direction MD is positioned on the center line L0. In the following description, an A4-size document sheet Q having a width of 210 mm in the main scanning direction MD will be referred to as a "document sheet Qa." An A5-size document sheet Q having a width of 148 mm in the main scanning direction MD will be referred to as a "document sheet Qb." An A6-size document sheet Q having a width of 105 mm in the main scanning direction MD will be referred to as a "document sheet Qc." It is noted that, in FIGS. 2 and 3A to 3C, a rightward direction is the main scanning direction MD, and a downward direction is the conveyance direction TD.

The document tray 10 is provided with two document guides 33. The two document guides 33 are configured to, when manually operated by the user, move along the main scanning direction MD in conjunction with each other, in a manner bilaterally symmetric with respect to the center line L0 of the document tray 10. Thereby, the two document guides 33 are set with a gap therebetween corresponding to a width of the document sheets Q placed on the document tray 10 in the main scanning direction MD. Thus, by placing the document sheets Q between the two document guides 33, the user is allowed to set the document sheets Q on the document tray 10 in such a manner that the center of the document sheets Q in the main scanning direction MD is positioned on the center line L0. As described above, the first front sensor FA is disposed near the center line L0. Hence, when there is a document sheet Q placed on the document tray 10, the first front sensor FA is brought into an ON state in which the first front sensor FA outputs an ON-state signal representing presence of a document sheet Q placed on the document tray 10. Meanwhile, when there is no document sheet Q placed on the document tray 10, the first front sensor FA is in an OFF state in which the first front sensor FA outputs an OFF-state signal representing that there is no document sheet Q placed on the document tray 10. The document guides 33 are connected with a document guide sensor 91 (see FIG. 4). The document guide sensor 91 is configured to detect a distance between the two document guides 33 in the main scanning direction MD, for instance, using a known encoder.

A state where an A4-size document sheet Qa is placed on the document tray 10 will be described with reference to FIGS. 2 and 3A. As shown in FIG. 3A, when the user places a document sheet Qa on the document tray 10 and moves the document guides 33 in such a manner that both side ends of the document sheet Qa are guided along the document guides 33, the document guides 33 are set in A4-positions A4P, as shown in FIG. 3A. At this time, the document guide sensor 91 detects a distance of 210 mm to 211 mm.

As shown in FIG. 2, when a document sheet Q having a size equal to or larger than the A4-size document sheet Qa is placed on the document tray 10, the fourth front sensor FD is brought into an ON state. Meanwhile, when a document sheet Q having a size equal to or larger than the A4-size document sheet Qa is not placed on the document tray 10, the fourth front sensor FD is in an OFF state. Namely, the auxiliary line L3 is set in a position that is about 95 to 100 mm away from the center line L0 in the upstream direction along the main scanning direction MD (i.e., a position that is about 5 to 10 mm away from an upstream side end of the document sheet Qa in the main scanning direction MD), and the fourth front sensor FD is disposed on the auxiliary line L3. Thereby, the image scanning apparatus 1 is enabled to detect whether a document sheet Q having a size equal to or larger than the A4-size document sheet Qa is placed on the document tray 10.

A state where an A5-size document sheet Qb is placed on the document tray 10 will be described with reference to FIGS. 2 and 3B. As shown in FIG. 3B, when the user places a document sheet Qb on the document tray 10 and moves the document guides 33 in such a manner that both side ends of the document sheet Qb are guided along the document guides 33, the document guides 33 are set in A5-positions A5P, as shown in FIG. 3B. At this time, the document guide sensor 91 detects a distance of 148 mm to 149 mm.

As shown in FIG. 2, when a document sheet Q having a size equal to or larger than the A5-size document sheet Qb is placed on the document tray 10, the third front sensor FC is brought into an ON state. Meanwhile, when a document sheet Q having a size equal to or larger than the A5-size document sheet Qb is not placed on the document tray 10, the third front sensor FC is in an OFF state. Namely, the auxiliary line L2 is set in a position that is about 65 to 70 mm away from the center line L0 in the upstream direction along the main scanning direction MD (i.e., a position that is about 4 to 9 mm away from an upstream side end of the document sheet Qb in the main scanning direction MD), and the third front sensor FC is disposed on the auxiliary line L2. Thereby, the image scanning apparatus 1 is enabled to detect whether a document sheet Q having a size equal to or larger than the A5-size document sheet Qb is placed on the document tray 10.

A state where an A6-size document sheet Qc is placed on the document tray 10 will be described with reference to FIGS. 2 and 3C. As shown in FIG. 3C, when the user places a document sheet Qc on the document tray 10 and moves the document guides 33 in such a manner that both side ends of the document sheet Qc are guided along the document guides 33, the document guides 33 are set in A6-positions A6P, as shown in FIG. 3C. At this time, the document guide sensor 91 detects a distance of 105 mm to 106 mm.

As shown in FIG. 2, when a document sheet Q having a size equal to or larger than the A6-size document sheet Qc is placed on the document tray 10, the second front sensor FB is brought into an ON state. Meanwhile, when a document sheet Q having a size equal to or larger than the A6-size document sheet Qc is not placed on the document tray 10, the second front sensor FB is in an OFF state. Namely, the auxiliary line L1 is set in a position that is about 45 to 50 mm away from the center line L0 in the upstream direction along the main scanning direction MD (i.e., a position that is about 2.5 to 7.5 mm away from an upstream side end of the document sheet Qc in the main scanning direction MD), and the second front sensor FB is disposed on the auxiliary line L1. Thereby, the image scanning apparatus 1 is enabled to detect whether a document sheet Q having a size equal to or larger than the A6-size document sheet Qc is placed on the document tray 10.

<Electrical Configuration of Image Scanning Apparatus>

Figure 4:
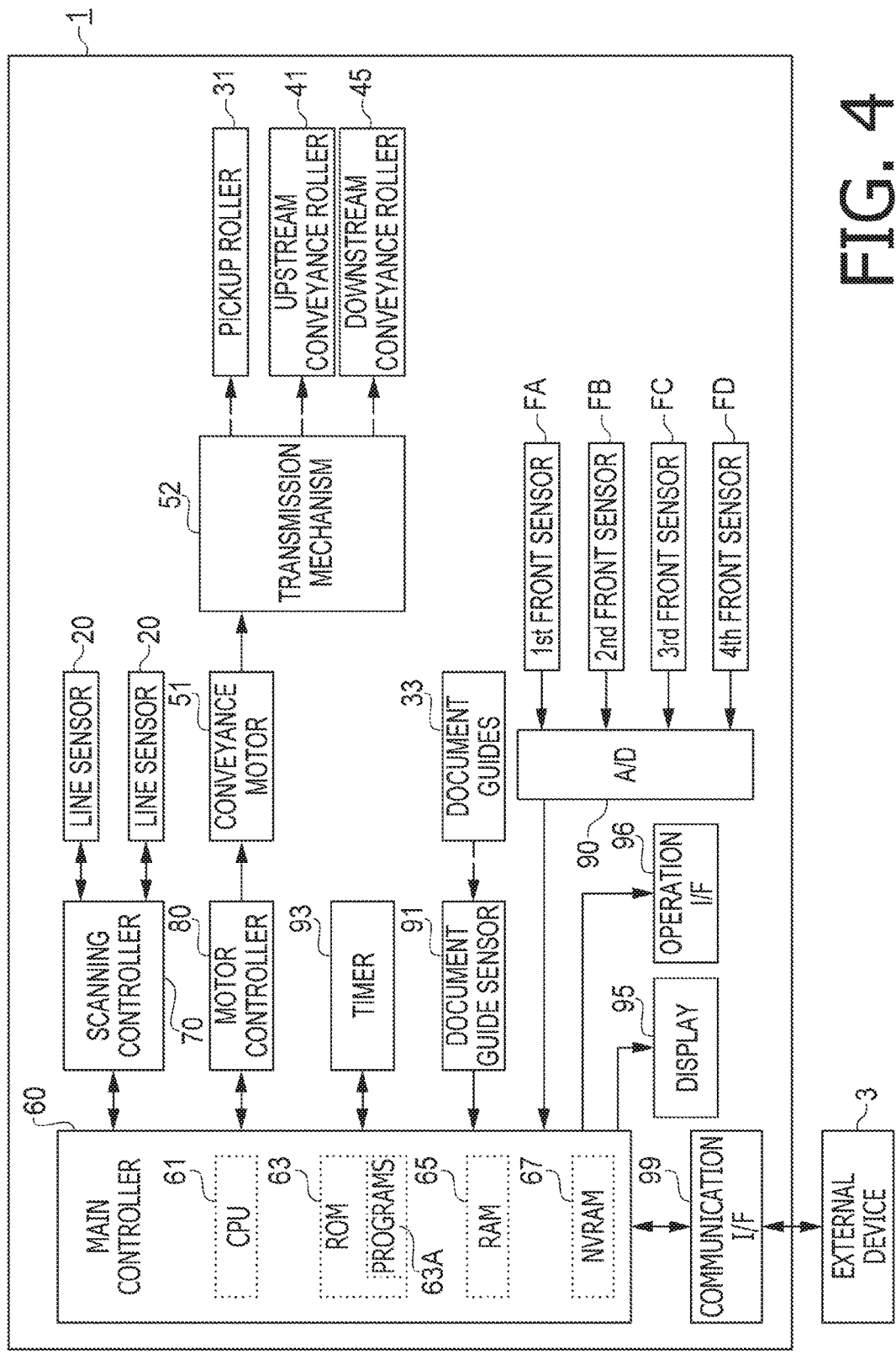
FIG. 4 is a block diagram schematically showing an electrical configuration of the image scanning apparatus in the illustrative embodiment according to one or more aspects of the present disclosure.

An electrical configuration of the image scanning apparatus 1 will be described with reference to FIG. 4. As shown in FIG. 4, the image scanning apparatus 1 includes a main controller 60, a scanning controller 70, a motor controller 80, an AD convertor 90, the document guide sensor 91, a timer 93, the operation I/F 96, the display 95, and a communication interface (hereinafter referred to as a "communication I/F") 99.

The main controller 60 takes overall control of the image scanning apparatus 1. The main controller 60 includes a CPU 61, a ROM 63, a RAM 65, and an NVRAM 67. The CPU 61 is configured to perform processes in accordance with programs 63A stored in the ROM 63. The RAM 65 is used as a work area by the CPU 61 which is performing processes. The NVRAM 67 is an electrically-rewritable nonvolatile memory, and stores various kinds of data. The CPU 61 performs various processes, and thereby, the main controller 60 achieves comprehensive control of the image scanning apparatus 1.

The main controller 60 may communicate with an external device, for instance, via the communication I/F 99. Then, when receiving a scan instruction issued in response to the first front sensor FA being brought into the ON state, the main controller 60 controls the scanning controller 70 and the motor controller 80 to perform image scanning of a document sheet Q based on the scan instruction. Afterward, the main controller 60 transmits image data representing a scanned image of the document sheet Q generated by the image scanning, to the external device 3 via the communication I/F 99. The external device 3 may be a personal computer and receive image data from the image scanning apparatus 1.

The scanning controller 70 drives and controls the line sensors 20 to perform image scanning of the document sheet Q being conveyed, in accordance with instructions from the main controller 60. The scanning controller 70 sequentially transmits, to the main controller 60, each piece of line data generated line-by-line image scanning by the line sensors 20. The main controller 60 generates the image data representing the scanned image of the document sheet Q by combining the received pieces of line data, and transmits the generated image data to the external device 3.

The motor controller 80 drives and controls the conveyance motor 51 to convey the document sheet Q from the document tray 10 to the discharge tray 15, in accordance with instructions from the main controller 60. For instance, the conveyance motor 51 may include a stepping motor. In this case, the motor controller 80 may control a conveyance amount of the document sheet Q by controlling a rotation amount of the conveyance motor 51.

The AD convertor 90 is configured to convert input signals from the front sensors FA, FB, FC, and FD into digital signals and transmit the digital signals to the main controller 60. The document guide sensor 91 is configured to detect a distance between the document guides 33 in the main scanning direction MD and transmit the detected distance to the main controller 60. The timer 93 is configured to, when activated after a below-mentioned waiting time is set therefor, begin to count to the set waiting time. The timer 93 is further configured to, after completion of the time counting, transmit a signal representing the completion of the time counting to the main controller 60. The operation I/F 96 is configured to, when operated by the user, input a signal corresponding to the user's operation into the main controller 60. The display 95 is configured to receive signals from the main controller 60 and display a status of the image scanning apparatus 1.

<Operations of Image Scanning Apparatus>

(Main Scanning Process)

Subsequently, operations of the image scanning apparatus 1 will be described with reference to relevant drawings. The image scanning apparatus 1 is configured to perform a main scanning process (see FIG. 5) to scan document sheets Q. Processes R1 to R10, in the main scanning process shown in FIG. 5, are to be performed by the main controller 60.

Figure 5:
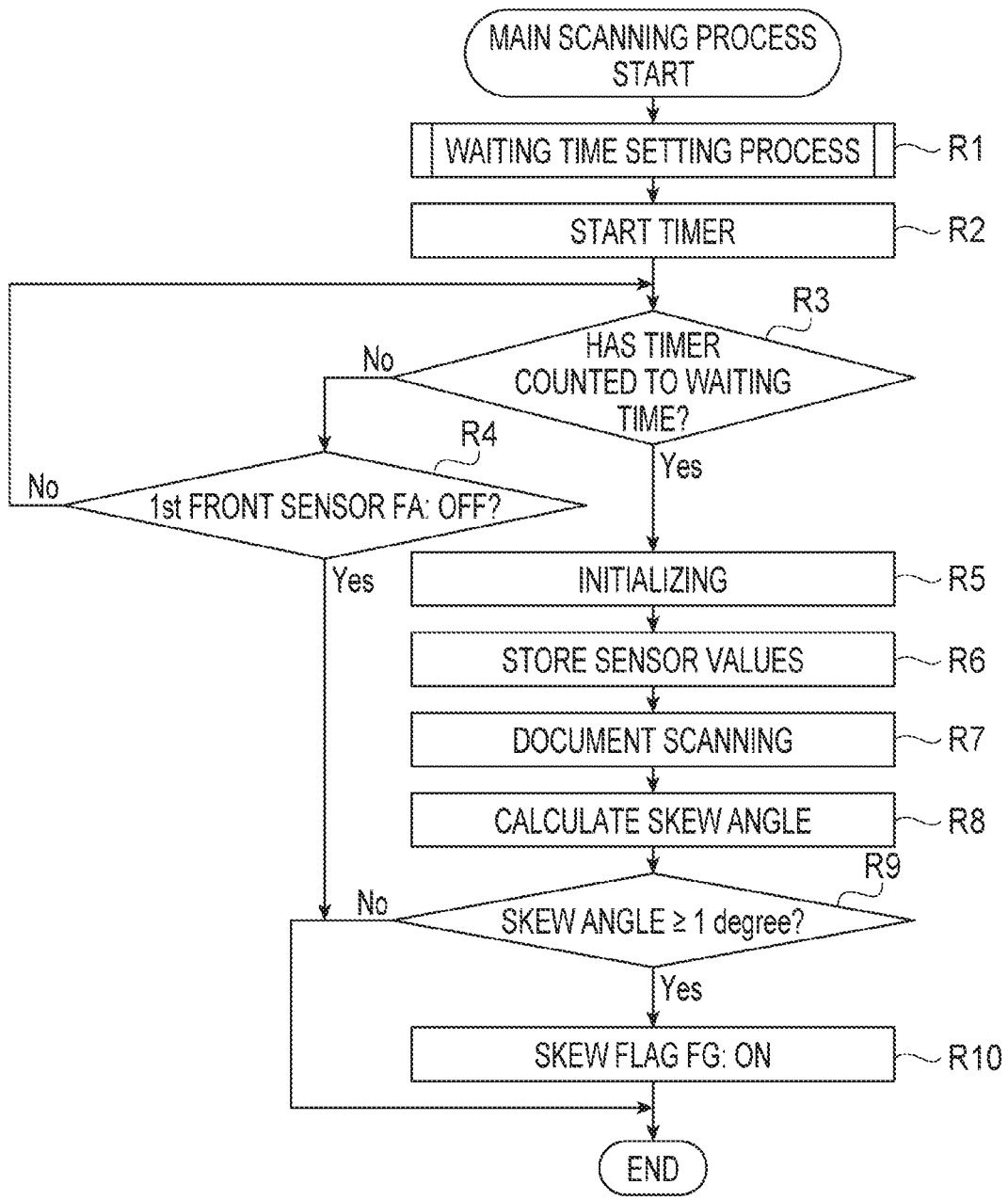
FIG. 5 is a flowchart showing a procedure of a main scanning process in the illustrative embodiment according to one or more aspects of the present disclosure.

The main scanning process shown in FIG. 5 is started in response to a document sheet Q being placed on the document tray 10. Namely, the main controller 60 begins the main scanning process in response to the first front sensor FA being brought into the ON state.

Figure 6:
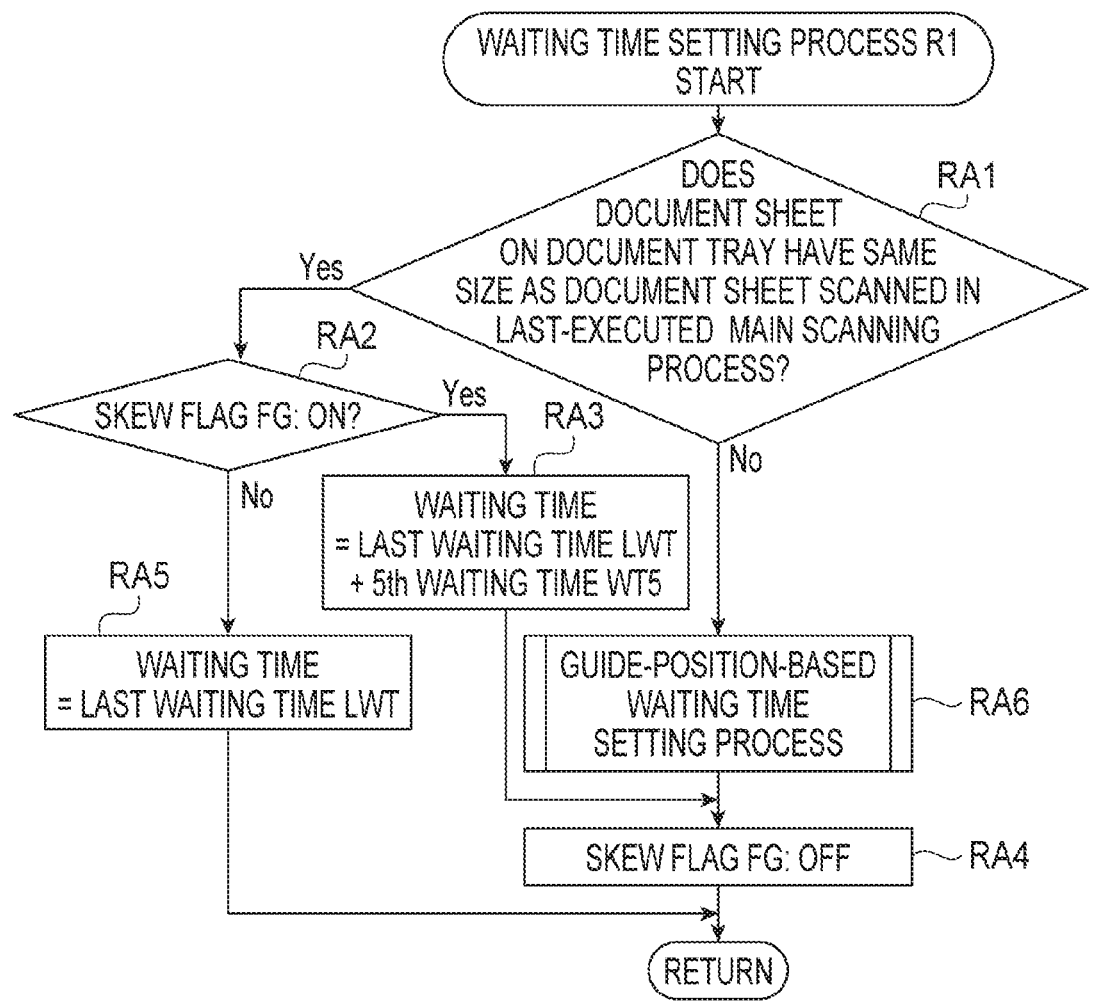
FIG. 6 is a flowchart showing a procedure of a waiting time setting process in the illustrative embodiment according to one or more aspects of the present disclosure.

The main controller 60 sets, for the timer 93, a waiting time to which the timer 93 is to count (R1). The waiting time setting process R1 (see FIG. 6) will be described in detail later. A general outline of the process R1 will be provided here. The main controller 60 determines whether the document sheet Q placed on the document tray 10 has the same size as a document sheet Q scanned in a last-executed main scanning process. When determining that the document sheet Q placed on the document tray 10 has the same size as the document sheet scanned in the last-executed main scanning process, the main controller 60 sets the waiting time for the timer 93 based on a last waiting time LWT. Meanwhile, when determining that the document sheet Q placed on the document tray 10 does not have the same size as the document sheet scanned in the last-executed main scanning process, the main controller 60 sets the waiting time for the timer 93 in accordance with the positions of the document guides 33.

The main controller 60 starts the timer 93 (R2). The process R1 is a process to set the waiting time in accordance with detection results of the document guide sensor 91 and the front sensors FB, FC, and FD. An elapsed time in the process R1 is negligibly short in comparison with the waiting time set for the timer 93. Therefore, the timer 93 may be considered to be started substantially in response to the first front sensor FA being brought into the ON state.

The main controller 60 determines whether the timer 93 has counted to the waiting time set in the process R1 (R3). When determining that the timer 93 has counted to the waiting time set in the process R1 (R3: Yes), the main controller 60 goes to a process R5. Meanwhile, when determining that the timer 93 has counted to the waiting time set in the process R1 (R3: No), the main controller 60 goes to a process R4.

The main controller 60 determines whether the first front sensor FA is in the OFF state (R4). When determining that the first front sensor FA is not in the OFF state (R4: No), the main controller 60 repeatedly performs the process R3. Meanwhile, when determining that the first front sensor FA is in the OFF state (R4: Yes), the main controller 60 terminates the main scanning process.

When determining that the timer 93 has counted to the waiting time set in the process R1 (R3: Yes), the main controller 60 performs an initializing process (R5). More specifically, the main controller 60 sets setting values necessary for the scanning controller 70 and the motor controller 80 to perform document scanning.

The main controller 60 stores document guide positions GP, a second detection value SV2, a third detection value SV3, a fourth detection value SV4, and the last waiting time LWT (R6). Specifically, the main controller 60 controls the document guide sensor 91 to detect positions of the document guides 33. The main controller 60 stores, into the RAM 65, the detected positions of the document guides 33 as the document guide positions GP. The main controller 60 stores, into the RAM 65, an ON/OFF state of the second front sensor FB as the second detection value SV2. The main controller 60 stores, into the RAM 65, an ON/OFF state of the third front sensor FC as the third detection value SV3. The main controller 60 stores, into the RAM 65, an ON/OFF state of the fourth front sensor FD as the fourth detection value SV4. The main controller 60 stores, into the RAM 65, the waiting time set for the timer 93 in the process R1 as the last waiting time LWT.

The main controller 60 performs a document scanning process (R7). Specifically, the main controller 60 issues an instruction to the motor controller 80, thereby controlling the motor controller 80 to convey the document sheet Q. The main controller 60 issues an instruction to the scanning controller 70, thereby controlling the line sensors 20 to perform a document scanning operation to scan the document sheet Q from a leading end to a trailing end of the document sheet Q in the conveyance direction TD. The main controller 60 acquires, via the scanning controller 70, scanned data representing images scanned by the line sensors 20, temporarily stores the scanned data into the RAM 65, and transmits the scanned data to the external device 3.

The main controller 60 calculates a skew angle CA from the scanned data (R8). Specifically, the main controller 60 extracts document leading-end data representing the leading end of the document sheet Q in the conveyance direction TD, from the scanned data stored in the RAM 65. Further, the main controller 60 obtains head line data representing a head line of the scanned data in the conveyance direction TD. Thereby, the main controller 60 calculates, as the skew angle CA, an angle between the leading end represented by the document leading-end data and the head line represented by the head line data.

The main controller 60 determines whether the skew angle CA is equal to or more than one degree (R9). When determining that the skew angle CA is less than one degree (R9: No), the main controller 60 terminates the main scanning process. Meanwhile, when determining that the skew angle CA is equal to or more than one degree (R9: Yes), the main controller 60 goes to the process R10.

The main controller 60 sets a skew flag FG to "ON" (R10). Specifically, the main controller 60 sets the skew flag FG to "ON" and stores the setting value (i.e., "ON") of the skew flag FG into the RAM 65. After completion of the process R10, the main controller 60 terminates the main scanning process.

(Waiting Time Setting Process)

When the waiting time setting process R1 (see FIG. 6) is started, the main controller 60 determines whether the document sheet Q placed on the document tray 10 has the same size as a document sheet Q scanned in a last-executed main scanning process (RA1). Specifically, the main controller 60 controls the document guide sensor 91 to detect positions of the document guides 33. The main controller 60 compares the positions detected by the document guide sensor 91 with the document guide positions GP. Further, the main controller 60 compares the ON/OFF state of the second front sensor FB with the second detection value SV2. Further, the main controller 60 compares the ON/OFF state of the third front sensor FC with the third detection value SV3. Further, the main controller 60 compares the ON/OFF state of the fourth front sensor FD with the fourth detection value SV4. When determining that the comparison results includes at least one non-coincident result, the main controller 60 determines that the document sheet Q placed on the document tray 10 does not have the same size as a document sheet Q scanned in a last-executed main scanning process (RA1: No), and goes to a process RA6. When determining that all the comparison results are coincident results, the main controller 60 determines that the document sheet Q placed on the document tray 10 has the same size as a document sheet Q scanned in a last-executed main scanning process (RA1: Yes), and goes to a process RA2. Immediately after the image scanning apparatus 1 is powered on, the document guide positions GP, the second detection value SV2, the third detection value SV3, and the fourth detection value SV4 are set to undetectable values as initial values.

The main controller 60 determines whether the skew flag FG is "ON" (RA2). When determining that the skew flag FG is not "ON" (RA2: No), the main controller 60 goes to a process RA5. Meanwhile, when determining that the skew flag FG is "ON" (RA2: Yes), the main controller 60 goes to a process RA3.

The main controller 60 sets a period of time obtained by adding a fifth waiting time WT5 to the last waiting time LWT, as a waiting time for the timer 93 (RA3). It is noted that the fifth waiting time WT5 is a period of time required for the user to realign a document sheet Q placed in a skewed manner. For instance, the fifth waiting time WT5 may be 0.5 seconds. When the waiting time is set 0.5 seconds longer than the last waiting time LWT, even a user, who placed a document sheet Q in a manner skewed at an angle of one degree or more in last-executed document scanning, may set a document sheet Q in a non-skewed manner.

The main controller 60 sets the skew flag FG to "OFF" (RA4). Specifically, the main controller 60 sets the skew flag FG to "OFF" and stores the setting value (i.e., "OFF") of the skew flag FG into the RAM 65. After completion of the process RA4, the main controller 60 terminates the waiting time setting process R1 and returns to the main scanning process.

When determining that the skew flag FG is not "ON" (RA2: No), the main controller 60 sets the last waiting time LWT for the timer 93 (RA5). After completion of the process RA5, the main controller 60 terminates the waiting time setting process R1 and returns to the main scanning process.

When determining that the document sheet Q placed on the document tray 10 does not have the same size as the document sheet Q scanned in the last-executed main scanning process (RA1: No), the main controller 60 sets a waiting time for the timer 93 based on the positions of the document guides 33 (RA6). The guide-position-based waiting time setting process RA6 (see FIG. 7A) will be described in detail later. A general outline of the process RA6 will be provided here. The main controller 60 determines which positions the document guides 33 are set in. When the document guides 33 are set in the A6-positions A6P, the main controller 60 determines whether the front sensors FB, FC, and FD are in an A6-state A6S. When the front sensors FB, FC, and FD are in the A6-state A6S, the main controller 60 sets a second waiting time WT2 for the timer 93. Meanwhile, when the front sensors FB, FC, and FD are not in the A6-state A6S, the main controller 60 sets a first waiting time WT1 for the timer 93. When the document guides 33 are set in the A5-positions A5P, the main controller 60 determines whether the front sensors FB, FC, and FD are in an A5-state A5S. When the front sensors FB, FC, and FD are in the A5-state A5S, the main controller 60 sets a third waiting time WT3 for the timer 93. Meanwhile, when the front sensors FB, FC, and FD are not in the A5-state A5S, the main controller 60 sets the first waiting time WT1 for the timer 93. When the document guides 33 are set in the A4-positions A4P, the main controller 60 determines whether the front sensors FB, FC, and FD are in an A4-state A4S. When the front sensors FB, FC, and FD are in the A4-state A4S, the main controller 60 sets a fourth waiting time WT4 for the timer 93. Meanwhile, when the front sensors FB, FC, and FD are not in the A4-state A4S, the main controller 60 sets the first waiting time WT1 for the timer 93. When the document guides 33 are set in positions other than the A6-positions A6P, the A5-positions A5P, and the A4-positions A4P, the main controller 60 sets the first waiting time WT1 for the timer 93. After completion of the process RA6, the main controller 60 goes to the process RA4. After completion of the process RA4, the main controller 60 terminates the waiting time setting process R1 and returns to the main scanning process.

For instance, the second waiting time WT2 may be 1.0 second. The second waiting time WT2 is set in a situation where the document guides 33 are set in the A6-positions A6P, and an A6-size document sheet Qc is placed on the document tray 10. Hence, the user may quickly place a document sheet Qc. Therefore, the second waiting time WT2 may be 1.0 second, which is set as short as possible while enabling the user to check and confirm alignment of a document sheet Qc placed between the document guides 33. For instance, the third waiting time WT3 may be 1.5 seconds. The third waiting time WT3 is set in a situation where the document guides 33 are set in the A5-positions A5P, and an A5-size document sheet Qb is placed. The A5-size document sheet Qb has a document size larger than the A6-size document sheet Qc. Hence, the A5-size document sheet Qb is smaller than the A6-size document sheet Qc in a specific ratio of a range over which the document guides 33 are allowed to guide side ends of a document sheet Q to an entire length of the side ends of the document sheet Q. The A5-size document sheet Qb is harder to place than the A6-size document sheet Qc. Therefore, the third waiting time WR3 may be set to 1.5 seconds, which is somewhat longer than the second waiting time WT2. For instance, the fourth waiting time WT4 may be 2.0 seconds. The fourth waiting time WT4 is set in a situation where the document guides 33 are set in the A4-positions A4P, and an A4-size document sheet Qa is placed. The A4-size document sheet Qa is smaller than the A5-size document sheet Qb in the aforementioned specific ratio. The A4-size document sheet Qa is harder to place than the A5-size document sheet Qb. Therefore, the fourth waiting time WT4 may be set to 2.0 seconds, which is somewhat longer than the third waiting time WT3. For instance, the first waiting time WT1 may be 3.0 seconds. The first waiting time WT1 is set in a situation where the positions of the document guides 33 are not consistent with the document size of a document sheet Q placed, and the document guides 33 are not allowed to properly guide the side ends of the document sheet Q. In this situation, the user needs to carefully place a document sheet Q in a properly aligned manner. Therefore, the first waiting time WT1 may be set to 3.0 seconds, which is longer than the third waiting time WT3.

Referring to FIGS. 2 and 7B, the A6-state A6S, the A5-state A5S, and the A4-state A4S will be described. When an A6-size document sheet Qc is placed on the document tray 10, the second front sensor FB is brought into the ON state, whereas the third front sensor FC and the fourth front sensor FD are in the OFF state. Therefore, the A6-state A6S is a state where the second front sensor FB is in the ON state, and the third front sensor FC and the fourth front sensor FD are in the OFF state. When an A5-size document sheet Qb is placed on the document tray 10, the second front sensor FB and the third front sensor FC are brought into the ON state, whereas the fourth front sensor FD is in the OFF state. Therefore, the A5-state A5S is a state where the second front sensor FB and the third front sensor FC are in the ON state, and the fourth front sensor FD is in the OFF state. When an A4-size document sheet Qa is placed on the document tray 10, the second front sensor FB, the third front sensor FC, and the fourth front sensor FD are brought into the ON state. Therefore, the A4-state A4S is a state where the second front sensor FB, the third front sensor FC, and the fourth front sensor FD are in the ON state.

(Guide-Position-Based Waiting Time Setting Process)

When the guide-position-based waiting time setting process RA6 is started, the main controller 60 determines which positions the document guides 33 are set in (RB1). Specifically, when the value detected by the document guide sensor 91 is 105 mm to 106 mm, the main controller 60 determines that the document guides 33 are set in the A6-positions A6P (RB1: A6-positions A6P), and goes to a process RB2. When the value detected by the document guide sensor 91 is 148 mm to 149 mm, the main controller 60 determines that the document guides 33 are set in the A5-positions A5P (RB1: A5-positions A5P), and goes to a process RB5. When the value detected by the document guide sensor 91 is 210 mm to 211 mm, the main controller 60 determines that the document guides 33 are set in the A4-positions A4P (RB1: A4-positions A4P), and goes to a process RB7. When the value detected by the document guide sensor 91 is not any of 105 mm to 106 mm, 148 mm to 149 mm, and 210 mm to 211 mm, the main controller 60 determines that the document guides 33 are set in positions other than the A4-positions A4P, the A5-positions A5P, and the A6-positions A6P (RB1: positions other than A4-positions A4P, A5-positions A5P, and A6-positions A6P), and goes to a process RB4.

The main controller 60 determines whether the front sensors FB, FC, and FD are in the A6-state A6S (RB2).

Specifically, when the second front sensor FB is in the ON state, and the third front sensor FC and the fourth front sensor FD are in the OFF state, the main controller 60 determines that the front sensors FB, FC, and FD are in the A6-state A6S (RB2: Yes), and goes to a process RB3. Meanwhile, when the second front sensor FB is not in the ON state, or at least one of the third front sensor FC and the fourth front sensor FD is not in the OFF state, the main controller 60 determines that the front sensors FB, FC, and FD are not in the A6-state A6S (RB2: No), and goes to the process RB4.

The main controller 60 sets the second waiting time WT2 for the timer 93 (RB3). After completion of the process RB3, the main controller 60 terminates the guide-position-based waiting time setting process RA6 and returns to the waiting time setting process R1.

When determining that the front sensors FB, FC, and FD are not in the A6-state A6S (RB2: No), or determining that the document guides 33 are set in positions other than the A4-positions A4P, the A5-positions A5P, and the A6-positions A6P (RB1: positions other than A4-positions A4P, A5-positions A5P, and A6-positions A6P), the main controller 60 sets the first waiting time WT1 for the timer 93 (RB4). After completion of the process RB4, the main controller 60 terminates the guide-position-based waiting time setting process RA6 and returns to the waiting time setting process R1.

When determining that document guides 33 are set in the A5-positions A5P (RB1: A5-positions A5P), the main controller 60 determines whether the front sensors FB, FC, and FD are in the A5-state A5S (RB5). Specifically, when the second front sensor FB and the third front sensor FC are in the ON state, and the fourth front sensor FD is in the OFF state, the main controller 60 determines that the front sensors FB, FC, and FD are in the A5-state A5S (RB5: Yes), and goes to a process RB6. Meanwhile, when at least one of the second front sensor FB and the third front sensor FC is not in the ON state, or the fourth front sensor FD is not in the OFF state, the main controller 60 determines that the front sensors FB, FC, and FD are not in the A5-state A5S (RB5: No), and goes to the process RB4.

The main controller 60 sets the third waiting time WT3 for the timer 93 (RB6). After completion of the process RB6, the main controller 60 terminates the guide-position-based waiting time setting process RA6 and returns to the waiting time setting process R1.

When determining that document guides 33 are set in the A4-positions A4P (RB1: A4-positions A4P), the main controller 60 determines whether the front sensors FB, FC, and FD are in the A4-state A4S (RB7). Specifically, when the second front sensor FB, the third front sensor FC, and the fourth front sensor FD are in the ON state, the main controller 60 determines that the front sensors FB, FC, and FD are in the A4-state A4S (RB7: Yes), and goes to a process RB8. Meanwhile, when at least one of the second front sensor FB, the third front sensor FC, and the fourth front sensor FD is not in the ON state, the main controller 60 determines that the front sensors FB, FC, and FD are not in the A4-state A4S (RB7: No), and goes to the process RB4.

The main controller 60 sets the fourth waiting time WT4 for the timer 93 (RB8). After completion of the process RB8, the main controller 60 terminates the guide-position-based waiting time setting process RA6 and returns to the waiting time setting process R1.

<Advantageous Effects of Illustrative Embodiment>

According to the illustrative embodiment, in the guide-position-based waiting time setting process RA6, in the process RB1, the main controller 60 determines which positions the document guides 33 are set in. When the document guides 33 are set in the A6-positions A6P, the main controller 60 goes to the process RB2. When the document guides 33 are set in positions other than the A4-positions A4P, the A5-positions A5P, and the A6-positions A6P, the main controller 60 goes to the process RB4. In the process RB2, the main controller 60 determines whether the front sensors FB, FC, and FD are in the A6-state A6S. When the front sensors FB, FC, and FD are in the A6-state A6S, the main controller 60 goes to the process RB3. In the process RB3, the main controller 60 sets the second waiting time WT2 for the timer 93. In the process RB4, the main controller 60 sets the first waiting time WT1 for the timer 93. Hence, when the document guides 33 are set in appropriate positions, the second waiting time WT2 is set for the timer 93. Further, when the document guides 33 are set in inappropriate positions, the first waiting time WT1 is set for the timer 93. Thus, the image scanning apparatus 1 may start document feeding in response to a waiting time appropriate for the detected positions of the document guides 33 having elapsed since a document sheet Q was placed on the document tray 10, without the user having to manually reset a waiting time for the timer 93.

In the illustrative embodiment, in the process RB1, the main controller 60 determines which positions the document guides 33 are set in. When the document guides 33 are set in the A5-positions A5P, the main controller 60 goes to the process RB5. When the document guides 33 are set in the A4-positions A4P, the main controller 60 goes to the process RB7. In the process RB5, the main controller 60 determines whether the front sensors FB, FC, and FD are in the A5-state A5S. When the front sensors FB, FC, and FD are in the A5-state A5S, the main controller 60 goes to the process RB6. In the process RB6, the main controller 60 sets the third waiting time WT3 for the timer 93. In the process RB7, the main controller 60 determines whether the front sensors FB, FC, and FD are in the A4-state A4S. When the front sensors FB, FC, and FD are in the A4-state A4S, the main controller 60 goes to the process RB8. In the process RB8, the main controller 60 sets the fourth waiting time WT4 for the timer 93. Thus, when the document guides 33 are set in the A6-positions A6P, the main controller 60 sets the second waiting time WT2 for the timer 93. Further, when the document guides 33 are set in the A5-positions A5P, the main controller 60 sets the third waiting time WT3 for the timer 93. Further, when the document guides 33 are set in the A4-positions A4P, the main controller 60 sets the fourth waiting time WT4 for the timer 93. Therefore, the image scanning apparatus 1 may start document feeding in response to a waiting time appropriate for a length of a document sheet Q having elapsed since the document sheet Q was placed on the document tray 10.

In the illustrative embodiment, in the process RB2, the main controller 60 determines whether the front sensors FB, FC, and FD are in the A6-state A6S. When the front sensors FB, FC, and FD are not in the A6-state A6S, the main controller 60 goes to the process RB4. In the process RB5, the main controller 60 determines whether the front sensors FB, FC, and FD are in the A5-state A5S. When the front sensors FB, FC, and FD are not in the A5-state A5S, the main controller 60 goes to the process RB4. In the process RB7, the main controller 60 determines whether the front sensors FB, FC, and FD are in the A4-state A4S. When the front sensors FB, FC, and FD are not in the A4-state A4S, the main controller 60 goes to the process RB4. Thus, when the positions of the document guides 33 are not consistent with the state of the front sensors FB, FC, and FD, the first waiting time WT1 is set for the timer 93. Therefore, the image scanning apparatus 1 may start document feeding in response to a waiting time appropriate for a correspondence relation between the detected positions of the document guides 33 and a size of a document sheet Q having elapsed since the document sheet Q was placed on the document tray 10.

According to the illustrative embodiment, in the waiting time setting process R1, in the process RA1, the main controller 60 determines whether a document sheet Q placed on the document tray 10 has the same size as a document sheet Q scanned in a last-executed main scanning process. When the document sheet Q placed on the document tray 10 has the same size as the document sheet Q scanned in the last-executed main scanning process, the main controller 60 goes to the process RA2. Meanwhile, when the document sheet Q placed on the document tray 10 does not have the same size as the document sheet Q scanned in the last-executed main scanning process, the main controller 60 goes to the process RA6. In the process RA2, the main controller 60 determines whether the skew flag FG is "ON." When the skew flag FG is "ON," the main controller 60 goes to the process RA3. Meanwhile, when the skew flag FG is not "ON," the main controller 60 goes to the process RA5. In the process RA3, the main controller 60 sets a time obtained by adding the fifth waiting time WT5 to the last waiting time LWT, as a waiting time for the timer 93 (RA3). In the process RA5, the main controller 60 sets the last waiting time LWT for the timer 93. When the skew flag FG is "ON," the document sheet Q was conveyed in a skewed manner in the last-executed main scanning process. Therefore, when a waiting time is set longer by the fifth waiting time WT5 than the last waiting time LWT, the image scanning apparatus 1 may start document feeding in response to the waiting time, which is appropriate for adjusting the positions of the document guides 33 to prevent a document sheet Q from being conveyed in a skewed manner, having elapsed since the document sheet Q was placed on the document tray 10.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of its versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modifications]

In the aforementioned illustrative embodiment, aspects of the present disclosure have been applied to the image scanning apparatus 1. Nonetheless, aspects of the present disclosure may be applied to a multi-function peripheral having a printer. Further, in the aforementioned illustrative embodiment, an example has been described in which each of the line sensors 20 includes contact image sensors. Nonetheless, each line sensor 20 may include a CCD unit configured to move along a sub scanning direction with a CCD mounted thereon, or may include a scanning unit having an image sensor and configured such that only a light source and a mirror are movable along the sub scanning direction.

In the aforementioned illustrative embodiment, the document tray 10 is configured as a center register type document tray. Nonetheless, the document tray 10 may be configured as a side register type document tray. In this case, only one of the document guides 33 may be movable along the main scanning direction MD.

In the aforementioned illustrative embodiment, the first waiting time WT1 is 3.0 seconds. Further, the second waiting time WT2 is 1.0 second. Nonetheless, for instance, the user may set, as the first waiting time WT1, a period of time different from 3.0 seconds and set, as the second waiting time WT2, a period of time different from 1.0 second, in such a manner that the first waiting time WT1 is longer than the second waiting time WT2.

In the aforementioned illustrative embodiment, the second waiting time WT2 is 1.0 second. Further, the third waiting time WT3 is 1.5 seconds. Further, the fourth waiting time WT4 is 2.0 seconds. Nonetheless, for instance, the user may set different periods of time from those exemplified in the aforementioned illustrative embodiment as the second waiting time WT2, the third waiting time WT3, and the fourth waiting time WT4, in such a manner that the second waiting time WT2 is the shortest among the three waiting times WT2, WT3, and WT4 and that the fourth waiting time WT4 is the longest among them.

In the aforementioned illustrative embodiment, the fifth waiting time WT5 is 0.5 seconds. Nonetheless, for instance, the user may set a different period of time from that exemplified in the aforementioned illustrative embodiment as the fifth waiting time WT5.

In the aforementioned illustrative embodiment, the timer 93 is configured as hardware to count to a set waiting time. Nonetheless, the timer 93 may be configured in a different manner. For instance, the timer 93 may include a time counter configured to only perform time counting, a storage configured to store a waiting time, and a comparator configured to compare a time counted by the time counter with the waiting time stored in the storage. In this case, the comparator may be further configured to, when the time counted by the counter becomes equal to the waiting time stored in the storage, transmit a signal representing completion of the time counting to the main controller 60.

Associations between elements exemplified in the aforementioned illustrative embodiment and elements according to aspects of the present disclosure may be exemplified as follows. The image scanning apparatus 1 may be an example of an "image scanning apparatus" according to aspects of the present disclosure. The document tray 10 may be an example of a "document tray" according to aspects of the present disclosure. The document guides 33 may be an example of a "document guide" according to aspects of the present disclosure. A "conveyor" according to aspects of the present disclosure may include at least one of the pickup roller 31, the separation pad 32, the conveyance path 40, the conveyance rollers 41, 42, 45, and 46, the motor controller 80, the conveyance motor 51, and the transmission mechanism 52. The document guide sensor 91 may be an example of a "position detector" according to aspects of the present disclosure. The first front sensor FA may be an example of a "first document detector" or a "document detector" according to aspects of the present disclosure. The timer 93 may be an example of a "timer" according to aspects of the present disclosure. The main controller 60 may be an example of a "controller" according to aspects of the present disclosure. The CPU 61 may be an example of a "processor" included in the "controller" according to aspects of the present disclosure. The ROM 63 may be an example of a "memory" included in the "controller" according to aspects of the present disclosure. Further, the ROM 63 may be an example of a "computer-readable medium" according to aspects of the present disclosure. The programs 63A stored in the ROM 63 may be an example of "processor-executable instructions" or "computer-readable instructions" according to aspects of the present disclosure. An "image scanner" according to aspects of the present disclosure may include the scanning controller 70 and the line sensors 20. The second front sensor FB may be an example of a "second document detector" according to aspects of the present disclosure. The fourth front sensor FD may be an example of a "third document detector" according to aspects of the present disclosure. The RAM 65 may be an example of a "storage" according to aspects of the present disclosure.

What is claimed is:

1. An image scanning apparatus comprising:
    a document tray configured to support one or more document sheets placed thereon;
    a conveyor configured to convey the one or more document sheets placed on the document tray, in a conveyance direction in a manner separated on a sheet-by-sheet basis;
    a document guide movable along a main scanning direction perpendicular to the conveyance direction, the document guide being configured to guide side ends of each of the one or more document sheets placed on the document tray;
    a position detector configured to detect a position of the document guide;
    a first document detector configured to detect whether there is a document sheet placed on the document tray;
    a timer configured to count to a waiting time set for the timer;
    an image scanner configured to perform image scanning of the one or more document sheets being conveyed by the conveyor; and
    a controller configured to:
        in response to the first document detector detecting a document sheet placed on the document tray, determine whether the detected position of the document guide is, among:
            a first guide position for guiding a first-size document sheet of a first particular size;
            a second guide position for guiding a second-size document sheet having a second particular size smaller than the first particular size; and
            a position other than the first guide position and the second guide position;
        perform a setting process to set a specific waiting time for the timer, based on the detected position of the document guide, the setting process comprising:
            when determining that the detected position of the document guide is the first guide position, setting a first waiting time as the specific waiting time for the timer;
            when determining that the detected position of the document guide is the second guide position, setting a third waiting time as the specific waiting time for the timer, the third waiting time being longer than the first waiting time; and
            when determining that the detected position of the document guide is other than the first guide position and the second guide position, setting a second waiting time as the specific waiting time for the timer, the second waiting time being longer than the first waiting time and being longer than the third waiting time; and
        in response to the timer counting to the specific waiting time since the detection, by the first document detector, of the document sheet placed on the document tray, perform a scanning process to control the conveyor to convey the document sheet and control the image scanner to perform image scanning of the document sheet, thereby acquiring a scanned image of the document sheet.

2. The image scanning apparatus according to claim 1, further comprising:
    a second document detector configured to detect whether there is a first-size document sheet of the first particular size placed on the document tray; and
    a third document detector configured to detect whether there is a second-size document sheet of the second particular size placed on the document tray,
    wherein the setting process further comprises:
        when determining that the detected position of the document guide is the first guide position, in response to the second document detector detecting a first-size document sheet placed on the document tray, setting the first waiting time as the specific waiting time for the timer;
        when determining that the detected position of the document guide is the first guide position, in response to the second document detector detecting that there is no first-size document sheet placed on the document tray, setting the second waiting time as the specific waiting time for the timer;
        when determining that the detected position of the document guide is the second guide position, in response to the second document detector detecting that there is no first-size document sheet placed on the document tray, and the third document detector detecting a document sheet having a size equal to or larger than the second particular size, setting the third waiting time as the specific waiting time for the timer; and
        when determining that the detected position of the document guide is the second guide position, in response to the third document detector detecting that there is no document sheet having a size equal to or larger than the second particular size, setting the second waiting time as the specific waiting time for the timer.

3. The image scanning apparatus according to claim 2, further comprising a storage,
    wherein the controller is further configured to:
        prior to performing the scanning process, perform a storing process comprising:
            storing, into the storage, the specific waiting time set for the timer, as a last waiting time;
            storing, into the storage, detection results of the second document detector and the third document detector as last detection results; and storing, into the storage, the detected position of the document guide as a last document-guide position;

calculate a skew angle of the document sheet from the scanned image of the document sheet;

when the calculated skew angle is equal to or more than a particular angle, set a skew angle flag to a first value and store the first value into the storage, the first value representing that the skew angle of the document sheet scanned in the scanning process is equal to or more than the particular angle;

in response to the first document detector detecting another document sheet placed on the document tray, determine whether the another document sheet has a same size as the document sheet scanned in the scanning process, by determining whether a newly detected position of the document guide is coincident with the last document-guide position stored in the storage and whether new detection results of the second document detector and the third document detector are coincident with the last detection results stored in the storage;

in response to determining that the another document sheet has the same size as the document sheet scanned in the scanning process, determine whether the skew angle of the document sheet scanned in the scanning process is equal to or more than the particular angle, based on a setting value of the skew angle flag stored in the storage;

in response to determining that the skew angle of the document sheet scanned in the scanning process is equal to or more than the particular angle, set a period of time obtained by adding a particular period of time to the last waiting time stored in the storage, as the specific waiting time for the timer;

in response to determining that the skew angle of the document sheet scanned in the scanning process is less than the particular angle, set the last waiting time stored in the storage, as the specific waiting time for the timer; and in response to determining that the another document sheet does not have the same size as the document sheet scanned in the scanning process, perform the setting process to set another specific waiting time for the timer based on the newly detected position of the document guide, set the skew angle flag to a second value different from the first value, and store the second value into the storage.

4. The image scanning apparatus according to claim 1, wherein the controller comprises:

a processor; and a memory storing processor-executable instructions configured to, when executed by the processor, cause the processor to:

in response to the first document detector detecting the document sheet placed on the document tray, determine whether the detected position of the document guide is the first guide position, the second guide position or a position other than the first guide position and the second guide position;

perform the setting process to set the specific waiting time for the timer; and in response to the timer counting to the specific waiting time since the detection of the document sheet placed on the document tray, perform the scanning process to acquire the scanned image of the document sheet.

5. A method implementable on a processor coupled with an image scanning apparatus having a tray, the method comprising:

detecting a sheet placed on the tray;

detecting a position of a document guide, the document guide being provided on the tray;

determining whether the detected position of the document guide is, among, a first guide position, a second guide position and a position other than the first guide position and the second guide position;

setting one of a first waiting time, a second waiting time, and a third waiting time, wherein the first waiting time is set when it is determined that the detected position of the document guide is the first guide position, the second waiting time is set when it is determined that the detected position of the document guide is other than the first guide position and the second guide position, the second waiting time being greater than the first waiting time and being greater than the third waiting time, and the third waiting time is set when is determined that the detected position of the document guide is the second guide position, the third waiting time being longer than the first waiting time;

determining whether the timer completes counting the one of the first waiting time, the second waiting time and the third waiting time since detecting the sheet on the tray; and in response to determining that the timer completes counting the one of the first waiting time, and the second waiting time and the third waiting time, starting conveying the sheet on the tray.

6. A non-transitory computer-readable medium storing computer-readable instructions that are executable by a processor coupled with an image scanning apparatus, the image scanning apparatus comprising:

a document tray configured to support one or more document sheets placed thereon;

a conveyor configured to convey the one or more document sheets placed on the document tray, in a conveyance direction in a manner separated on a sheet-by-sheet basis;

a document guide movable along a main scanning direction perpendicular to the conveyance direction, the document guide being configured to guide side ends of each of the one or more document sheets placed on the document tray;

a position detector configured to detect a position of the document guide;

a first document detector configured to detect whether there is a document sheet placed on the document tray;

a timer configured to count to a waiting time set for the timer; and an image scanner configured to perform image scanning of the one or more document sheets being conveyed by the conveyor, the instructions being configured to, when executed by the processor, cause the processor to:

in response to the first document detector detecting a document sheet placed on the document tray, determine whether the detected position of the document guide is, among:

a first guide position for guiding a first-size document sheet of a first particular size;

a second guide position for guiding a second-size document sheet having a second particular size smaller than the first particular size; and a position other than the first guide position and the second guide position;

perform a setting process to set a specific waiting time for the timer, based on the detected position of the document guide, the setting process comprising:

when determining that the detected position of the document guide is the first guide position, setting a first waiting time as the specific waiting time for the timer;

when determining that the detected position of the document guide is the second guide position, setting a third waiting time as the specific waiting time for the timer, the third waiting time being longer than the first waiting time; and when determining that the detected position of the document guide is other than the first guide position and the second guide position, setting a second waiting time as the specific waiting time for the timer, the second waiting time being longer than the first waiting time and being longer than the third waiting time; and in response to the timer counting to the specific waiting time since the detection, by the first document detector, of the document sheet placed on the document tray, perform a scanning process to control the conveyor to convey the document sheet and control the image scanner to perform image scanning of the document sheet, thereby acquiring a scanned image of the document sheet.

7. The non-transitory computer-readable medium according to claim 6, wherein the image scanning apparatus further comprises:
a second document detector configured to detect whether there is a first-size document sheet of the first particular size placed on the document tray; and
a third document detector configured to detect whether there is a second-size document sheet of the second particular size placed on the document tray, wherein the setting process further comprises:
when determining that the detected position of the document guide is the first guide position, in response to the second document detector detecting a first-size document sheet placed on the document tray, setting the first waiting time as the specific waiting time for the timer;

when determining that the detected position of the document guide is the first guide position, in response to the second document detector detecting that there is no first-size document sheet placed on the document tray, setting the second waiting time as the specific waiting time for the timer;

when determining that the detected position of the document guide is the second guide position, in response to the second document detector detecting that there is no first-size document sheet placed on the document tray, and the third document detector detecting a document sheet having a size equal to or larger than the second particular size, setting the third waiting time as the specific waiting time for the timer; and when determining that the detected position of the document guide is the second guide position, in response to the third document detector detecting that there is no document sheet having a size equal to or larger than the second particular size, setting the second waiting time as the specific waiting time for the timer.

8. The non-transitory computer-readable medium according to claim 7, wherein the instructions are further configured to, when executed by the processor, cause the processor to:
prior to performing the scanning process, perform a storing process comprising:
storing, into the storage, the specific waiting time set for the timer, as a last waiting time;
storing, into the storage, detection results of the second document detector and the third document detector as last detection results; and
storing, into the storage, the detected position of the document guide as a last document-guide position;

calculate a skew angle of the document sheet from the scanned image of the document sheet;

when the calculated skew angle is equal to or more than a particular angle, set a skew angle flag to a first value and store the first value into the storage, the first value representing that the skew angle of the document sheet scanned in the scanning process is equal to or more than the particular angle;

in response to the first document detector detecting another document sheet placed on the document tray, determine whether the another document sheet has a same size as the document sheet scanned in the scanning process, by determining whether a newly detected position of the document guide is coincident with the last document-guide position stored in the storage and whether new detection results of the second document detector and the third document detector are coincident with the last detection results stored in the storage;

in response to determining that the another document sheet has the same size as the document sheet scanned in the scanning process, determine whether the skew angle of the document sheet scanned in the scanning process is equal to or more than the particular angle, based on a setting value of the skew angle flag stored in the storage;

in response to determining that the skew angle of the document sheet scanned in the scanning process is equal to or more than the particular angle, set a period of time obtained by adding a particular period of time to the last waiting time stored in the storage, as the specific waiting time for the timer;

in response to determining that the skew angle of the document sheet scanned in the scanning process is less than the particular angle, set the last waiting time stored in the storage, as the specific waiting time for the timer; and in response to determining that the another document sheet does not have the same size as the document sheet scanned in the scanning process, perform the setting process to set another specific waiting time for the timer based on the newly detected position of the document guide, set the skew angle flag to a second value different from the first value, and store the second value into the storage.

* * * * *